US007471344B1

(12) United States Patent
Wakabayashi

(10) Patent No.: US 7,471,344 B1
(45) Date of Patent: Dec. 30, 2008

(54) DISPLAY APPARATUS PERIODICALLY MODULATING IMAGE-SIGNAL CHARACTERISTICS

(75) Inventor: Toshitsugu Wakabayashi, Tokyo (JP)

(73) Assignee: Mitsubishi Denki K.K., Tokyo (JP)

( * ) Notice: Subject to any disclaimer, the term of this patent is extended or adjusted under 35 U.S.C. 154(b) by 0 days.

(21) Appl. No.: 09/499,369

(22) Filed: Feb. 7, 2000

(30) Foreign Application Priority Data

Jul. 27, 1999 (JP) ................................ 11/211986

(51) Int. Cl.
*H04N 5/14* (2006.01)

(52) U.S. Cl. ....................... 348/707; 348/678; 348/380; 348/618

(58) Field of Classification Search ................. 348/805, 348/625, 627, 628, 629, 377, 378, 380, 819; 345/208, 100; *H04N 5/14*
See application file for complete search history.

(56) References Cited

U.S. PATENT DOCUMENTS 4,376,952 A * 3/1983 Troiano ...................... 348/627
6,020,939 A * 2/2000 Rindal et al. ................ 348/805
6,346,936 B2 * 2/2002 Murayama et al. .......... 345/208

FOREIGN PATENT DOCUMENTS

JP 06-121195 * 4/1994
JP A6121195 4/1994

* cited by examiner

*Primary Examiner*—Trang U Tran
(74) *Attorney, Agent, or Firm*—Birch, Stewart, Kolasch & Birch, LLP

(57) ABSTRACT

An image display apparatus has a control circuit that periodically varies a characteristic, such as an amplitude characteristic or timing characteristic, of the displayed image signal. Periodic variations may be produced by passing the image signal through a variable inductance element, for example, or by alternately selecting two amplifier circuits with different gain characteristics, or by periodically delaying the image signal. The periodic variations reduce peaks in the spectrum of unintended radiation emissions, and suppress undesired moire patterns in the displayed image.

11 Claims, 6 Drawing Sheets

FIG. 4
PRIOR ART
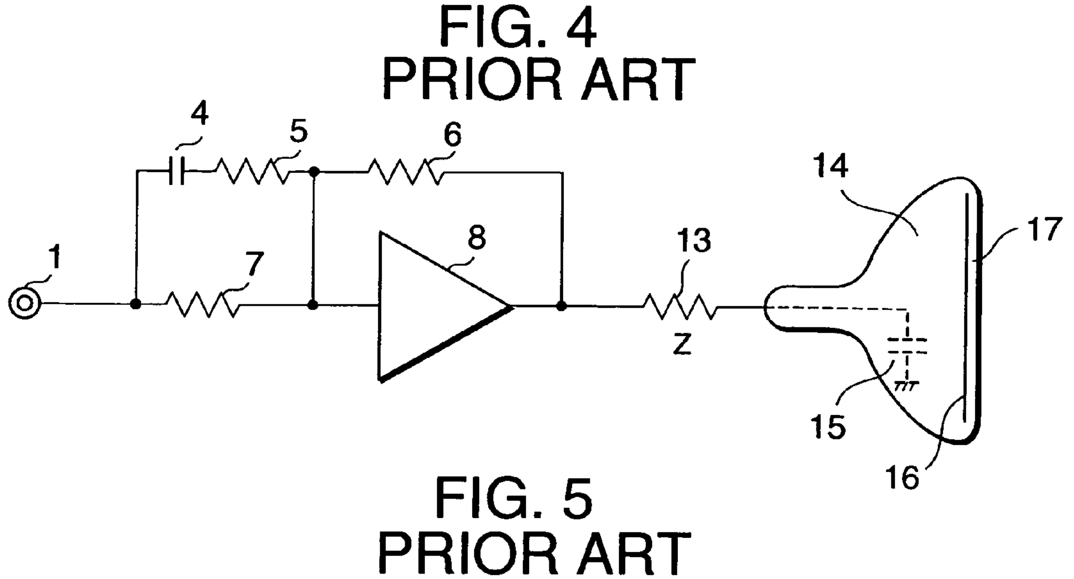
FIG. 5
PRIOR ART
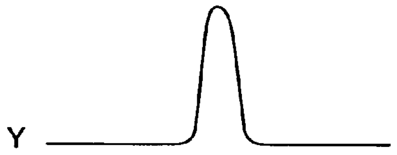
FIG. 6A
PRIOR ART
FIG. 6B
PRIOR ART
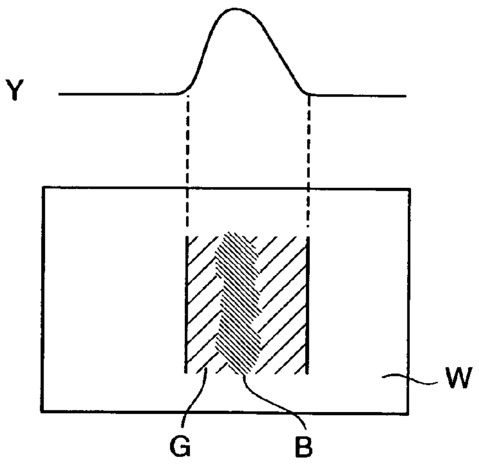
FIG. 7
PRIOR ART
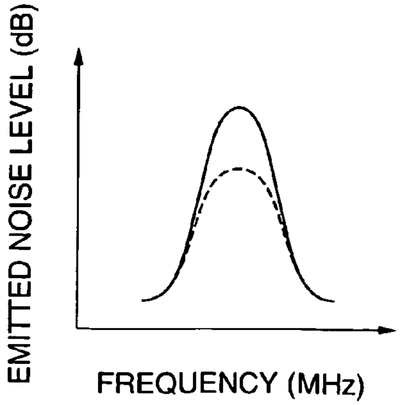

DISPLAY APPARATUS PERIODICALLY MODULATING IMAGE-SIGNAL CHARACTERISTICS

BACKGROUND OF THE INVENTION

The present invention relates to an image display apparatus having reduced emissions and enhanced clarity.

A common type of image display apparatus comprises an image signal processing circuit that receives and amplifies an image signal, and a cathode-ray tube with high-voltage electron guns that displays the amplified image signal. Due in part to the combination of high cathode voltages with high image-signal frequencies, such apparatus emits unintended electromagnetic radiation. To prevent interference with other electronic equipment, and for the safety of the viewer, the unintended radiation must remain within established limits. The frequency spectrum of the unintended radiation must not have peaks exceeding the established limit levels.

A resistor inserted between the signal-processing circuit and the cathode-ray tube is a common means of assuring compliance with these limits. The impedance provided by the resistor lowers the peak levels of the unintended radiation.

This resistor, however, has the unwanted side effect of spreading out voltage waveforms at the cathode of the cathode-ray tube, so that edges that should be sharp become blurred. This effect is particularly noticeable when a black object is displayed on a white background. If the impedance of the resistor is high enough for adequate suppression of unintended radiation, the displayed edges may be converted from sharp black-white boundaries to indistinct gray areas.

Image clarity can also be degraded by moire patterns produced by the shadow mask or aperture grille of the cathode-ray tube.

SUMMARY OF THE INVENTION

An object of the present invention is to reduce emissions of unintended radiation from image display apparatus, while maintaining a sharp displayed image.

Another object of the invention is to suppress moire patterns.

The invented image display apparatus has an image signal processing circuit, an image display unit that displays the processed image signal as an image, and a control circuit that varies a characteristic of the image signal in a periodic manner. The characteristic is preferably altered once per spatial line in each temporal frame, and once per temporal frame in each spatial line. The varied characteristic is, for example, an amplitude characteristic or a timing characteristic.

The control circuit comprises, for example, an inductance element with a periodically varying inductance. Alternatively the control circuit comprises a pair of amplifier circuits with different gain characteristics, the two amplifier circuits being selected alternately, or a delay line that is periodically used to delay the image signal.

The periodic variations in the image-signal characteristic reduce peaks in the spectrum of unintended radiation emitted by the image display apparatus.

The periodic variations also suppress moire patterns.

BRIEF DESCRIPTION OF THE DRAWINGS

In the attached drawings:

FIG. 4 is a circuit diagram illustrating the conventional display apparatus;

FIG. 5 and FIG. 6A illustrate cathode waveforms produced by different impedance values in FIG. 4;

FIG. 6B illustrates an image displayed by the waveform in FIG. 6A;

FIG. 7 shows spectra of unintended radiation emitted by the conventional display apparatus for different values of the impedance in FIG. 4;

DETAILED DESCRIPTION OF THE INVENTION

Figure 1:
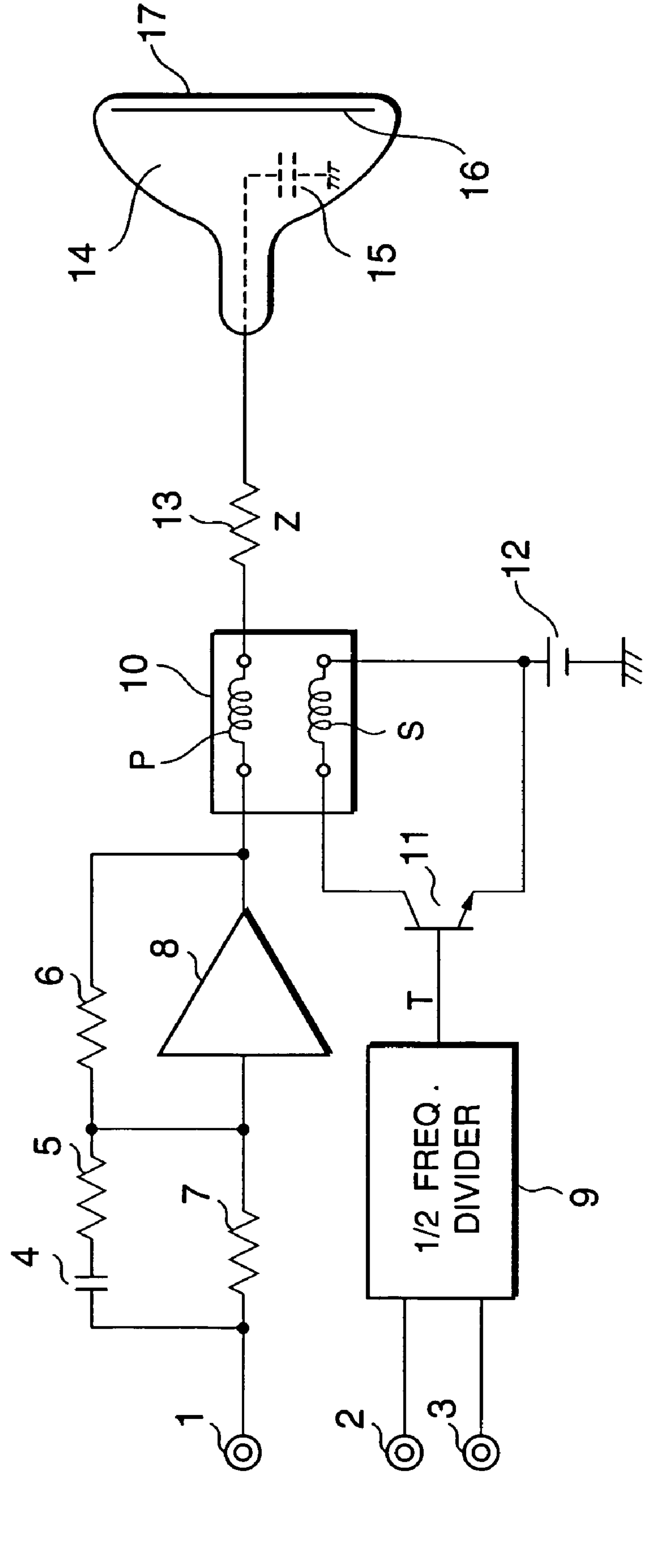
FIG. 1 is a circuit diagram illustrating a first embodiment of the invention.

Embodiments of the invention will be described with reference to the attached drawings, in which like parts are indicated by like reference characters.

Referring to FIG. 1, a first embodiment of the invention has an image signal input terminal 1, a horizontal synchronizing signal input terminal 2, a vertical synchronizing signal input terminal 3, a capacitor 4, resistors 5, 6, 7, an amplifier 8, a divide-by-two (½) frequency (FREQ.) divider 9, a common-mode coil 10, a transistor 11, a power source 12, another resistor 13, and a cathode-ray tube 14. The cathode-ray tube 14 has a cathode (not visible) with a certain capacitance 15, a shadow mask (or aperture grille) 16, and a screen 17.

The image signal received at the image signal input terminal 1 is divided into spatial lines and temporal frames. A spatial line corresponds to a horizontal raster on the screen 17 of the cathode-ray tube 14, and will be referred to below as a horizontal line. Each horizontal line is indicated by a pulse of the horizontal synchronizing signal. A temporal frame comprises one complete set of horizontal lines, representing all rasters displayed on the screen 17. Temporal frames are identified by pulses of the vertical synchronizing signal, and may be referred to as vertical frames. A temporal frame may be subdivided into interlaced fields, also identified by vertical synchronizing pulses.

Capacitor 4, resistors 5, 6, 7, and amplifier 8 constitute the image signal processing circuit in the first embodiment. Frequency divider 9, common-mode coil 10, transistor 11, and power source 12 constitute the control circuit that periodically varies the characteristics of the image signal.

Resistor 7 is coupled in series between the image signal input terminal 1 and the input terminal of the amplifier 8. Resistor 6 is a feedback resistor, coupled between the input and output terminals of the amplifier 8. These two resistors 6, 7 determine the gain of the amplifier 8. Capacitor 4 and resistor 5 are coupled in series between the image signal input terminal 1 and resistor 6, and in parallel with resistor 7 between the image signal input terminal 1 and the input terminal of the amplifier 8, forming a frequency compensation network for the amplifier 8. Resistor 13 is inserted in series between the output terminal of the amplifier 8 and the cathode of the cathode-ray tube 14, providing an impedance Z that limits the rate at which the cathode capacitance 15 is charged and discharged. The value of Z is smaller than in the prior art.

The common-mode coil 10, also referred to as a transformer, is an inductance element having two tightly coupled windings disposed on the same magnetic core. The primary winding P is coupled in series with resistor 13 between the output terminal of the amplifier 8 and the cathode of the cathode-ray tube 14. The secondary winding S is coupled to the emitter and collector electrodes of the transistor 11, forming a loop in which current can flow when transistor 11 is switched on. The emitter of transistor 11 is coupled to the power source 12, placing the secondary winding S in series between the power source 12 and the collector of transistor 11.

The frequency divider 9 is a timing circuit that receives a horizontal synchronizing signal from the horizontal synchronizing signal input terminal 2, receives a vertical synchronizing signal from the vertical synchronizing signal input terminal 3, and generates a timing signal T with one-half the frequency of the horizontal synchronizing signal. The frequency divider 9 toggles T between two voltage levels, denoted '0' and '1' below, at each horizontal synchronizing pulse. The frequency divider 9 also reverses the '0' and '1' levels, thereby reversing the phase of the timing signal T, at each vertical synchronizing pulse that indicates a new temporal frame. The timing signal T is applied to the base of transistor 11.

Next, the operation of the first embodiment will be described.

The image signal received at the image signal input terminal 1 is amplified by the amplifier 8 with the gain determined by resistors 6 and 7. The high-frequency gain is enhanced by the frequency compensation network comprising capacitor 4 and resistor 5, but high-frequency components are then attenuated by the common-mode coil 10, the series resistor 13, and the cathode capacitance 15.

In the common-mode coil 10, when transistor 11 is switched off and the secondary-winding circuit is open, high-frequency attenuation is caused by the inductance of the primary winding P. When transistor 11 is switched on and the secondary-winding circuit is closed, current is induced in the secondary winding. The magnetic fields generated by the primary current and secondary current oppose each other, reducing the net inductance acting on the primary winding P, thereby reducing the attenuation caused by this inductance.

Transistor 11 is switched on and off in alternate horizontal lines. If the frequency spectrum of the image signal received at the cathode of the cathode-ray tube 14 were to be measured, the high-frequency end of the spectrum would appear to be raised in horizontal lines in which transistor 11 is switched on, and lowered in horizontal lines in which transistor 11 is switched off.

Figure 2A:
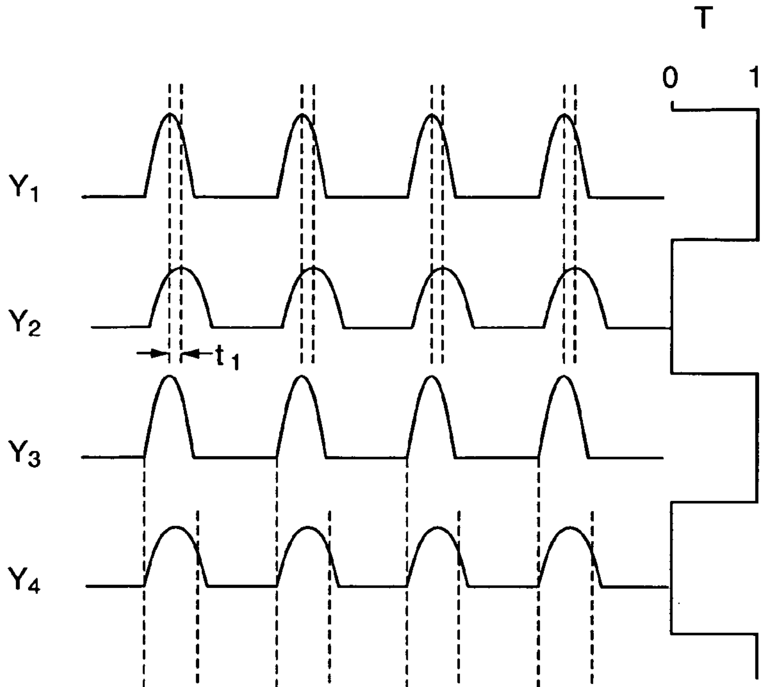
FIG. 2A is a waveform diagram illustrating the operation of the first embodiment.

This effect is illustrated in FIG. 2A, which shows waveforms $Y_1$, $Y_2$, $Y_3$, $Y_4$ of the image signal received at the cathode of the cathode-ray tube 14 in four consecutive horizontal lines of the same temporal frame. The waveform of the timing signal T is also shown. High-frequency components of the image signal are more suppressed when the timing signal T is at the '0' level and transistor 11 is switched off than when T is at the '1' level and transistor 11 is switched on. Consequently, waveforms $Y_1$ and $Y_3$ have higher and sharper profiles than do waveforms $Y_2$ and $Y_4$. In addition, the phase or timing of the image signal, that is, the location of the amplitude peaks, is shifted by an amount $t_1$, lagging in waveforms $Y_2$ and $Y_4$ as compared with waveforms $Y_1$ and $Y_3$. In a given temporal frame, accordingly, both the amplitude and timing characteristics of the image signal change in an alternating manner from one horizontal line to the next.

The phase of the timing signal T is reversed at every new frame. If the image does not change, then in the next frame, waveforms $Y_1$ and $Y_3$ will have lower amplitude profiles than waveforms $Y_2$ and $Y_4$, and waveforms $Y_1$ and $Y_3$ will lag waveforms $Y_2$ and $Y_4$. Accordingly, in each horizontal line, the amplitude and timing characteristics of the image signal alternate from one temporal frame to the next.

Figure 2B:
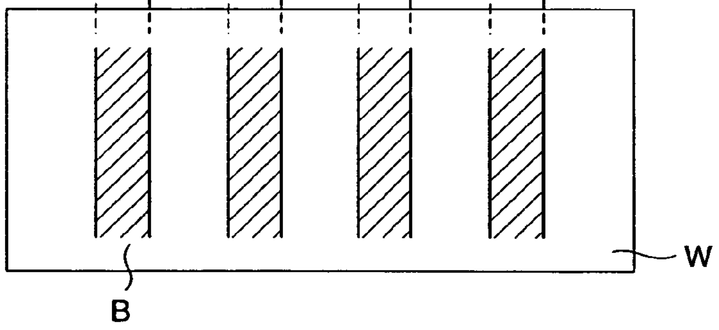
FIG. 2B illustrates the image displayed by the waveforms in FIG. 2A.

As shown in FIG. 2B, the image displayed by the signals illustrated in FIG. 2A comprises vertical black stripes B on a white background W. The width of the stripes is increased slightly by the phase lag occurring in alternate lines and frames, but the increase is slight. Moreover, because the image-signal characteristics alternate at every horizontal line and at every temporal frame, the eye does not readily perceive the variations. The displayed image seems to have uniform characteristics everywhere on the screen. The viewer perceives a pattern of straight black stripes with sharp boundaries and no unwanted gray areas.

Figure 3:
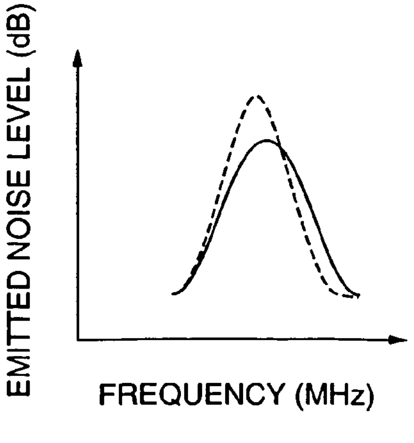
FIG. 3 shows spectra of unintended radiation emitted by the first embodiment and a conventional display apparatus.

FIG. 3 illustrates the spectrum of unintended radiation emitted in the first embodiment, and in a conventional apparatus that will be illustrated below, when the image shown in FIG. 2B is displayed. Frequency in megahertz (MHz) is shown on the horizontal axis, and the unintended-radiation or noise level in decibels (dB) is shown on the vertical axis. The solid line represents the emitted noise spectrum of the first embodiment; the dotted line represents the emitted noise spectrum of the conventional apparatus. The first embodiment lowers the peak of the noise spectrum by reducing the cathode voltage in alternate horizontal lines in each temporal frame. The slight timing offset $t_1$ in alternate lines also reduces the peak level of the noise spectrum a little. The first embodiment is thus able to stay within the allowable limits for unintended radiation emissions despite the comparatively small value of the impedance Z.

For comparison, FIG. 4 shows a conventional apparatus having the image signal input terminal 1, capacitor 4, resistors 5, 6, 7, 13, amplifier 8, cathode-ray tube 14, cathode capacitance 15, shadow mask (or aperture grille) 16, and screen 17, but lacking the control circuit of the first embodiment. FIG. 5 shows a typical image-signal waveform Y produced at the cathode of the cathode-ray tube 14 if the impedance Z of resistor 13 is comparatively small, as in the first embodiment. FIG. 6A shows the same waveform Y if the impedance Z is increased to reduce unintended radiation. The increased impedance spreads the waveform considerably. FIG. 6B shows the effect of this spreading on a displayed image comprising a black vertical stripe B on a white background W. Prominent gray areas G are created at the edges of the stripe. These gray areas are readily perceptible because they are displayed in all horizontal lines in all temporal frames.

FIG. 7 shows the noise spectrum emitted by the conventional apparatus when the impedance Z is comparatively small (solid line) and comparatively large (dotted line). Increasing the impedance Z reduces the peak level of the noise spectrum, by attenuating high-frequency components at the cathode of the cathode-ray tube 14, but the increased impedance degrades the image as shown in FIG. 6B.

Figure 8:
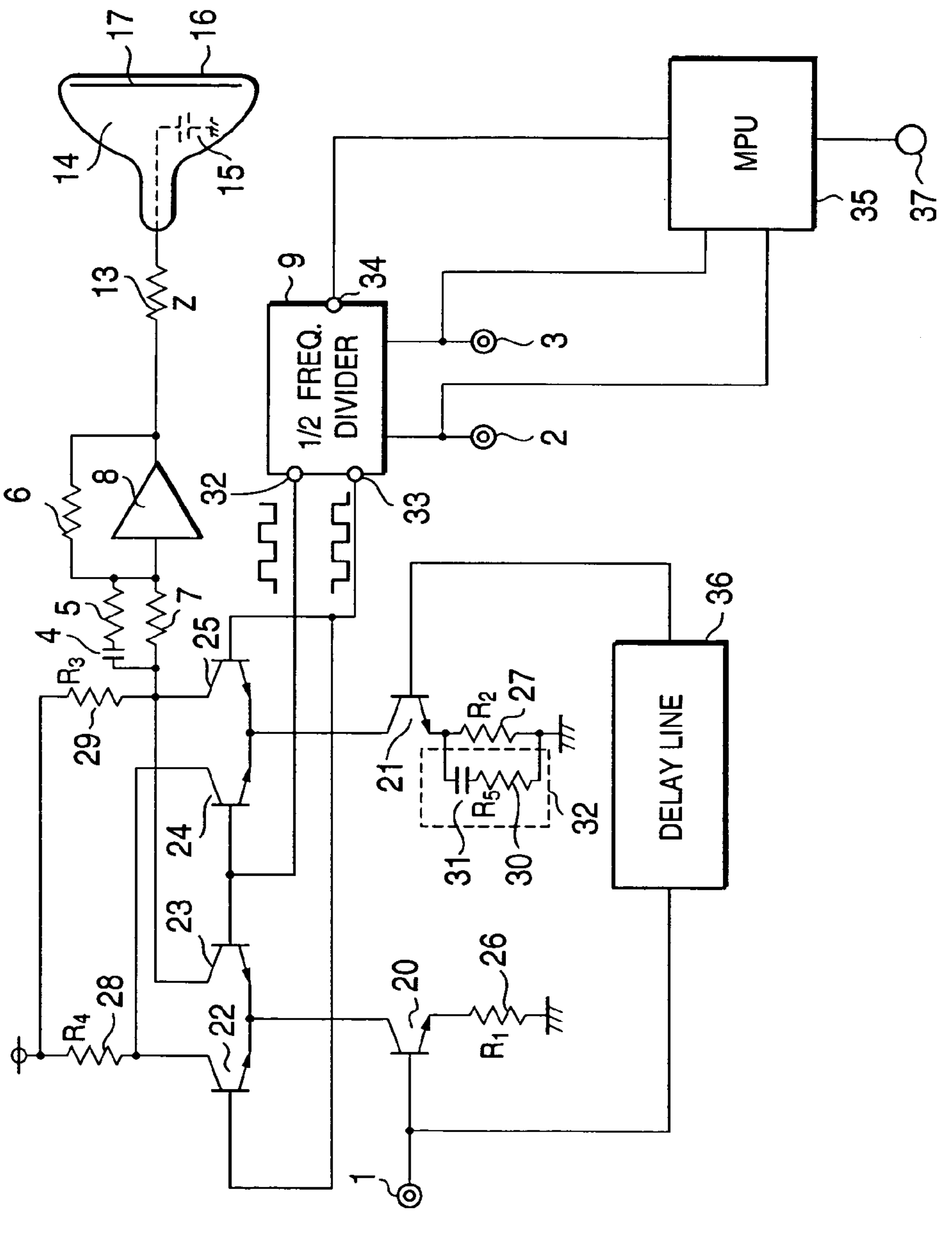
FIG. 8 is a circuit diagram illustrating second, third, fourth, and fifth embodiments of the invention.

FIG. 8 illustrates the second, third, fourth, and fifth embodiments of the invention. The control circuit in these embodiments replaces the common-mode coil, transistor, and power source of the first embodiment with a pair of amplifier circuits comprising transistors 20 to 25, resistors 26 to 30, and a capacitor 31. The frequency divider 9 now has two output terminals 32, 33 and an on-off terminal 34, which is coupled to a microprocessor unit (MPU) 35. The control circuit also comprises a delay line 36, and the microprocessor unit 35 is coupled to an external control 37 such as a manually operated switch. The delay line 36 is used in the third embodiment, the microprocessor unit 35 in the fourth embodiment, and the external control 37 in the fifth embodiment.

Transistors 20, 22, and 23 constitute a first amplifier circuit having resistors 26, 28, and 29 as load resistors. Transistors 21, 24, and 25 constitute a second amplifier circuit having resistors 27, 28, and 29 as load resistors. Resistor 30 and capacitor 31 constitute an emitter peaking circuit 32, also referred to as an emitter frequency compensation network, for frequency compensation of the second amplifier circuit. The emitter peaking circuit 32 enhances the high-frequency gain of the second amplifier circuit.

Resistors 26, 27, 29, 28, 30 have resistances $R_1$, $R_2$, $R_3$, $R_4$, $R_5$, respectively. In the second embodiment, $R_1$ and $R_2$ are equal ($R_1=R_2$), and $R_3$ and $R_4$ are equal ($R_3=R_4$).

The image signal input terminal 1 is coupled to the base electrode of transistor 20 and to the input terminal of the delay line 36. The output terminal of the delay line 36 is coupled to the base of transistor 21. The first amplifier circuit and second amplifier circuit both amplify the image signal, but the image signal amplified by the second amplifier circuit has a timing delay imparted by the delay line 36. In the second embodiment, this timing delay is zero, and the delay line 36 may be omitted.

When switched on by the signal supplied to the on-off terminal 34, the frequency divider 9 operates as described in the first embodiment, but generates two complementary timing signals. The timing signal obtained at output terminal 32 is equal to the timing signal obtained at output terminal 33 with a 180° phase lag. Output terminal 32 is coupled to the base electrodes of transistors 23 and 24 in the amplifier circuits, while output terminal 33 is coupled to the base electrodes of transistors 22 and 25.

The collector terminals of transistors 23 and 25, which are the output terminals of the first and second amplifier circuits, are coupled through resistor 7 to the input terminal of amplifier 8.

The first amplifier circuit has a gain of $R_4/R_1$. At frequencies sufficiently high to be coupled with negligible loss through capacitor 31, the second amplifier circuit has a gain of $R_3/(R_2 \times R_5/(R_2+R_5))$, which is higher than the gain of the first amplifier circuit. Both the first and second amplifier circuits are inverting amplifiers, as is amplifier 8.

Figure 10:
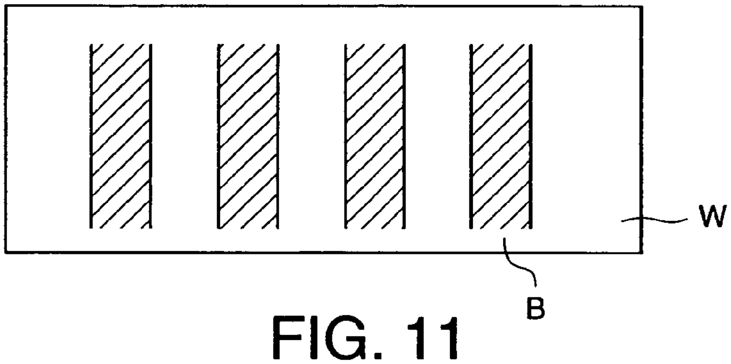
FIG. 10 illustrates the image displayed by the waveforms in FIG. 9.
Figure 11:
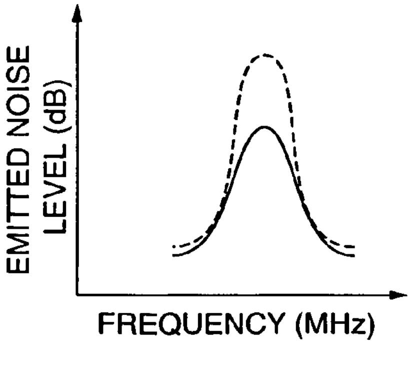
FIG. 11 shows spectra of unintended radiation emitted by the second embodiment and a conventional display apparatus.

Next, the operation of the second embodiment will be described with reference to FIGS. 9, 10, and 11.

When the frequency divider 9 is switched on, it selects the first amplifier circuit and second amplifier circuit in alternate horizontal lines. In FIG. 9, waveform $T_1$ is the timing signal output at terminal 32 of the frequency divider 9, $T_2$ is the timing signal output at terminal 33, waveform $V_1$ is the image signal applied to the base of transistor 20, waveform $V_2$ is the identical image signal applied to the base of transistor 21, waveform $X_1$ is the signal output from the first amplifier circuit to amplifier 8 in a first horizontal line, in which timing signal $T_1$ is high and timing signal $T_2$ is low, waveform $X_2$ is the signal output from the second amplifier circuit to amplifier 8 in a second horizontal line, in which timing signal $T_1$ is low and timing signal $T_2$ is high, waveform $Y_1$ is the voltage received at the cathode of the cathode-ray tube 14 in the first horizontal line, and waveform $Y_2$ is the voltage received at the cathode in the second horizontal line.

Figure 9:
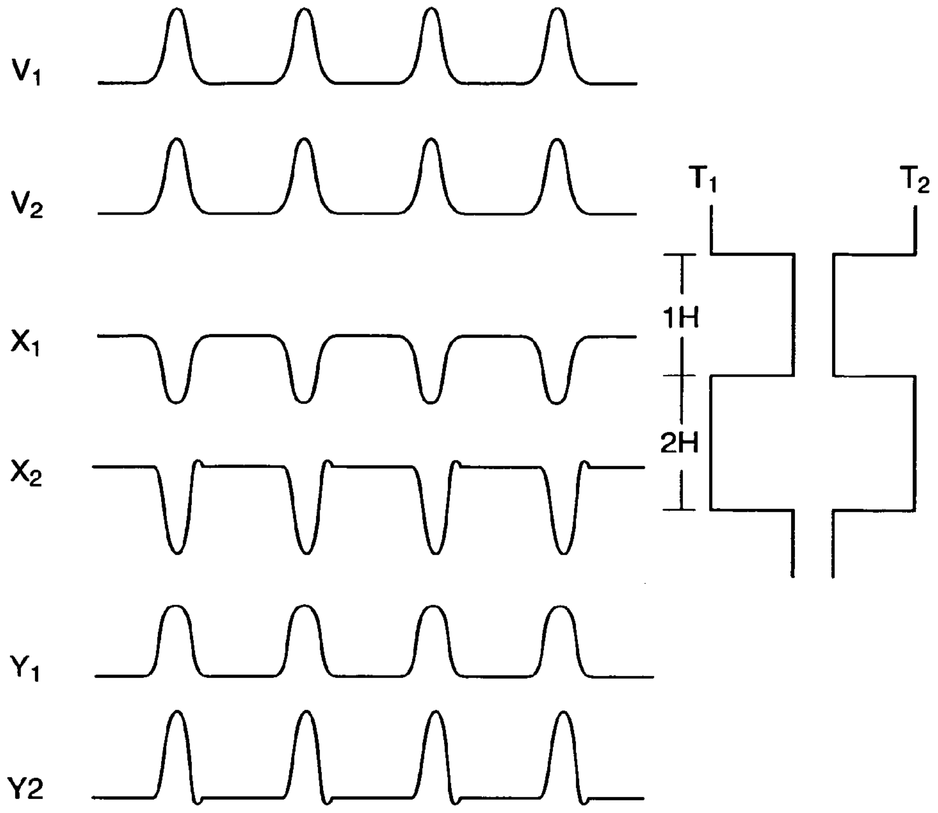
FIG. 9 is a waveform diagram illustrating the operation of the second embodiment.

By a suitable choice of values of the resistor 30 and capacitor 31, it is easy to produce waveforms of the type shown in FIG. 9, in which the amplitude of the high-frequency components of the image signal rises and falls in alternate lines. The frequency divider 9 reverses the phase of the two timing signals $T_1$ and $T_2$ in each temporal frame, so the high-frequency amplitude characteristic of each horizontal line rises and falls in alternate temporal frames. As in the first embodiment, the eye does not readily perceive these variations in the amplitude characteristic; the displayed image seems to have uniform characteristics in all horizontal lines. Specifically, for the signals in FIG. 9, the eye perceives a steady pattern of vertical black stripes, as shown in FIG. 10. No gray areas are perceived, because the waveforms in FIG. 9 are not spread.

Unintended noise radiation is reduced because the cathode voltage of the cathode-ray tube 14 is reduced in alternate horizontal lines. In FIG. 11, the solid line shows the noise spectrum achieved in the second embodiment, while the dotted line shows the noise spectrum that would be obtained if the first and second amplifier circuits were to be removed.

In a variation of the second embodiment, frequency compensation is extended to low-frequency components, so the amplitude of these components also changes in alternate spatial lines and alternate temporal frames.

Next, the third embodiment will be described with reference to FIGS. 8, 12, 13, and 14. The same waveform notation is employed in FIG. 12 as in FIG. 9.

The third embodiment differs from the second embodiment in that the delay line 36 provides a predetermined nonzero timing delay, and the values of resistor 30 and capacitor 31 are selected so that the high-frequency components output by the first amplifier circuit have the same amplitude as the high-frequency components output by the second amplifier circuit.

Figure 12:
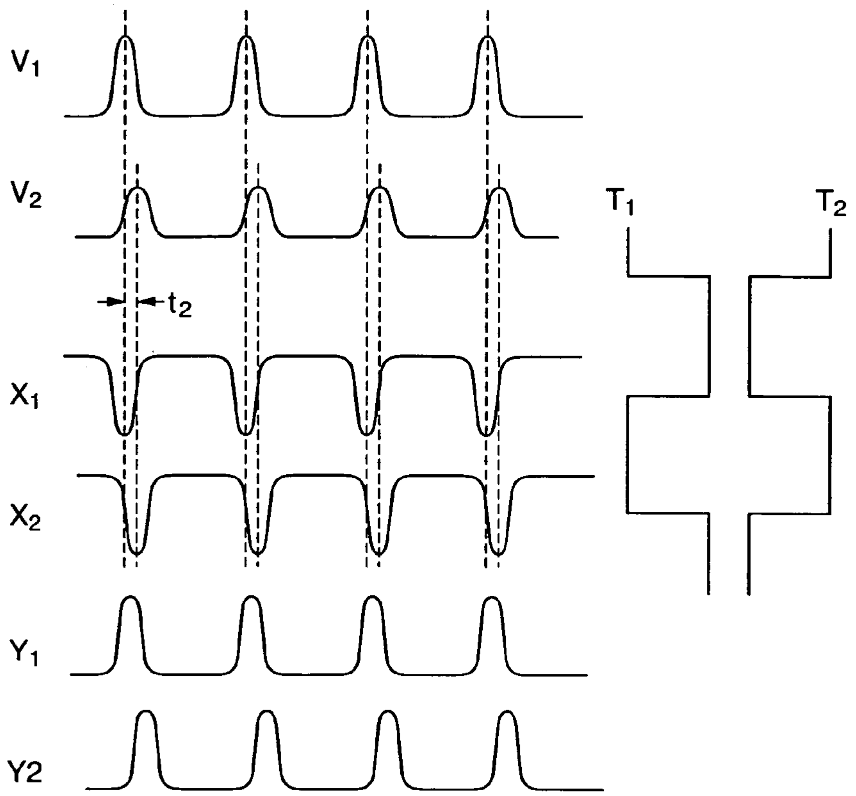
FIG. 12 is a waveform diagram illustrating the operation of the third embodiment.

Referring to FIG. 12, the waveform $V_2$ applied to the base of transistor 21 is delayed by an amount $t_2$ with respect to the waveform $V_1$ applied to the base of transistor 20, and is also reduced in amplitude by attenuation in the delay line 36. After amplification in the first and second amplifier circuits, the two waveforms $X_1$ and $X_2$ have identical amplitudes, but the $X_2$ still lags $X_1$. The cathode waveforms $Y_1$ and $Y_2$ in alternate lines are also identical in amplitude, with $Y_2$ lagging $Y_1$.

Figure 13:
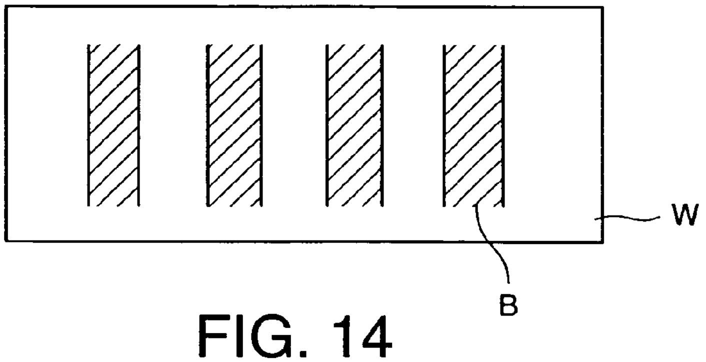
FIG. 13 illustrates the image displayed by the waveforms in FIG. 12.
Figure 14:
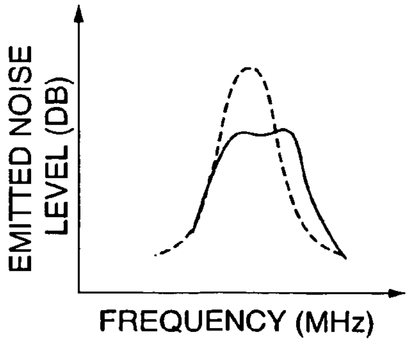
FIG. 14 shows spectra of unintended radiation emitted by the third embodiment and a conventional display apparatus.

FIG. 13 shows the corresponding part of the displayed image, again comprising vertical black stripes B on a white background W. As in the second embodiment, the frequency divider 9 reverses the phase of the timing signals $T_1$ and $T_2$ in alternate temporal frames, so that the image signal timing switches both from one line to the next in each frame, and from one frame to the next in each line, and the variations are not readily perceived. The lag $t_2$ is not large enough to create objectionable gray areas at the edges of the stripes. Although the third embodiment does not reduce the cathode voltage in alternate horizontal lines, the lag $t_2$ has the effect of spreading the noise spectrum as shown in FIG. 14, so that instead of a spectrum with a single high peak, as indicated by the dotted line, a wider and lower noise spectrum is obtained, as indicated by the solid line. Noise emissions are thereby reduced to an allowable level at all frequencies.

Next, the fourth embodiment will be described, with reference again to FIG. 8.

In the fourth embodiment, the microprocessor unit 35 determines the resolution of the image signal from the synchronizing signals received at input terminals 2 and 3. The microprocessor unit 35 classifies the resolution as high or low, by counting the number of horizontal synchronizing pulses per vertical synchronizing pulse, for example, and comparing the result with a predetermined value.

If the image signal has high resolution, the microprocessor unit 35 switches the frequency divider 9 on by sending an active logic level to the on-off terminal 34, and the fourth embodiment operates as described in the second embodiment, if the delay of the delay line 36 is zero, or the third embodiment, if the delay is non-zero.

If the image signal has low resolution, the microprocessor unit 35 switches the frequency divider 9 off by sending the inactive logic level to the on-off terminal 34, and the on-off terminal 34 holds the timing signals $T_1$ and $T_2$ fixed, one being high and the other low. If the delay line 36 has a non-zero delay, timing signal $T_1$ should be held high, to select the first amplifier circuit. If the delay line 36 has zero delay, either timing signal $T_1$ or $T_2$ may be held high, provided the first and second amplifier circuits have the same gain. In either case, the amplified image signal has the same amplitude and timing characteristics in all horizontal lines.

A high-resolution image signal generates a higher level of unintended high-frequency noise emissions than does a low-resolution signal, because the higher resolution allows higher spatial frequencies to be expressed. When the resolution is high, there is an increased need to suppress noise emissions by varying the signal characteristics on a line-by-line basis, and at the same time, the effects of such variations are less likely to be perceived, because each horizontal line occupies less space on the screen 17. When the resolution is low, the noise level is intrinsically low, even without line-by-line variation of the signal characteristics, and if such variations were to be introduced, the effects would be more visible because each horizontal line occupies more space on the screen 17.

The fourth embodiment enables the same circuitry to be employed in both high-resolution and low-resolution display apparatus, which is an advantage for the manufacturer.

Next, the fifth embodiment will be described with reference to FIG. 8.

In the fifth embodiment, the external control 37 is used to suppress moire patterns. Moire patterns can be caused by variations in the grille pitch of the shadow mask 16 in the cathode-ray tube 14. Ideally, the grille pitch is perfectly uniform, but for various reasons, including geometrical distortion of the shadow mask 16, slight variations may occur. Moire patterns arise from interference caused by these pitch variations as the electron beam in the cathode-ray tube 14 passes through the grille.

It is known that moire patterns can be suppressed by a slight change in the deflection current in the deflection coils (not visible) of the cathode-ray tube 14 in alternate horizontal lines. In the fifth embodiment, the first and second amplifier circuits are used to achieve a similar effect by controlling the characteristics of the image signal.

In the fifth embodiment, if a moire pattern is observed, the external control 37 is used to command the microprocessor unit 35 to activate the frequency divider 9, causing the characteristics of the image signal to change in alternate horizontal lines in each temporal frame, and in alternate temporal frames in each horizontal line, thereby breaking up the moire pattern and improving the clarity of the displayed image. The moire pattern can be suppressed in this way by changing amplitude characteristics as in the second embodiment, or timing characteristics as in the third embodiment. Changing the timing characteristics of the image signal is particularly effective.

If a moire pattern is not observed, the frequency divider 9 may be switched off.

In a variation of the fifth embodiment, the common-mode coil 10 of the first embodiment, shown in FIG. 1, is employed for moire suppression, the frequency divider 9 being switched on if a moire pattern is observed. At other times, the frequency divider 9 is switched off, and the transistor 11 is held in the on state, so that the image signal has the same characteristics in all horizontal lines. Alternately, the transistor 11 may be held in the off state, enabling the common-mode coil 10 to suppress high-frequency noise emissions more effectively.

As described above, the present invention modulates the image signal by changing the signal characteristics in alternate horizontal lines in each temporal frame, and in alternate temporal frames in each horizontal line. These variations have the effect of reducing peaks in the emitted noise spectrum, enabling limits on unintended radiation emissions to be met with the insertion of a comparatively small impedance between the image signal processing circuit and the cathode-ray tube. Noise emissions can thus be reduced to allowable levels without perceptible loss of image clarity, particularly in high-resolution display apparatus. The invented modulation technique can also be used to suppress moire patterns.

The invention is not restricted to the modulation scheme described above, in which signal characteristics switch back and forth in alternate horizontal lines and alternate temporal frames. Similar effects can be obtained with other periodic changes in the signal characteristics.

The invention has been described in relation to apparatus employing a cathode-ray tube, but can also be used to reduce unintended radiation emissions in apparatus with other types of image display units, including flat-panel display units.

The microprocessor unit 35 in FIG. 8 may be replaced with another type of control unit, such as a microcontroller unit.

Those skilled in the art will recognize that further variations are possible within the scope claimed below.

What is claimed is:

1. An image display apparatus, comprising:

an image signal processing circuit receiving an image signal and processing the image signal for display as an image;

an image display unit receiving the image signal processed by the image signal processing circuit, and displaying the processed image signal as an image on a screen; and a control circuit receiving said image signal from said image signal processing circuit and varying a frequency characteristic of the image signal in a periodic manner, wherein said control circuit includes a coil having a primary winding and a secondary winding, and passes said image signal through said primary winding while controlling current passing through said secondary winding to vary an inductance value of said primary winding in said periodic manner, thereby varying said frequency characteristic.

2. The image display apparatus of claim 1, wherein the image is divided into spatial lines and temporal frames, and the control circuit alters said frequency characteristic once per spatial line in each temporal frame.

3. The image display apparatus of claim 2, wherein the control circuit also alters said frequency characteristic once per said temporal frame in each spatial line.

4. The image display apparatus of claim 1, wherein the control circuit comprises a timing circuit receiving a first synchronizing signal indicating said spatial lines and a second synchronizing indicating said temporal frames, and generating a timing signal by dividing a frequency of the first synchronizing signal, toggling the timing signal once per said spatial line and reversing a phase of the timing signal once per said temporal frame, said frequency characteristic being controlled according to the timing signal.

5. The image display apparatus of claim 1, wherein the control circuit alternately opens and closes the secondary winding in said periodic manner.

6. An image display apparatus, comprising:

an image signal processing circuit receiving an image signal and processing the image signal for display as an image;

an image display unit receiving the image signal processed by the image signal processing circuit, and displaying the processed image signal as an image on a screen; and a control circuit varying a waveform characteristic of the image signal in a periodic manner, wherein said waveform characteristic is an amplitude characteristic, and the control circuit comprises:

a first amplifier circuit amplifying the image signal with a first gain characteristic;

a second amplifier circuit amplifying the image signal with a second gain characteristic differing from the first gain characteristic; and a timing circuit selecting the first amplifier circuit and the second amplifier circuit alternately.

7. The image display apparatus of claim 6, wherein the second amplifier circuit includes a frequency compensation network causing the second gain characteristic to differ from the first gain characteristic at certain frequencies.

8. An image display apparatus, comprising:

an image signal processing circuit receiving an image signal and processing the image signal for display as an image;

an image display unit receiving the image signal processed by the image signal processing circuit, and displaying the processed image signal as an image on a screen; and a control circuit varying a waveform characteristic of the image signal in a periodic manner, wherein said waveform characteristic is a timing characteristic, and the control circuit comprises:

a first amplifier circuit amplifying the image signal;

a delay line delaying the image signal;

a second amplifier circuit coupled to the delay line, amplifying the delayed image signal; and a timing circuit selecting the first amplifier circuit and the second amplifier circuit alternately.

9. An image display apparatus comprising:

an image signal processing circuit receiving an image signal and processing the image signal for display as an image;

an image display unit receiving the image signal processed by the image signal processing circuit, and displaying the processed image signal as an image on a screen; and a control circuit receiving said image signal from said image signal processing circuit and varying a waveform characteristic of the image signal in a periodic manner, further comprising a control unit that determines a resolution of the image signal and activates the control circuit, when said resolution is higher than a predetermined value and does not activate the control circuit when said resolution is lower than the predetermined value.

10. A method of processing an image signal for display as an image by an image display unit, comprising the step of:

periodically varying a waveform characteristic of the image signal, wherein said step of periodically varying further comprises the steps of:

amplifying the image signal with a first gain characteristic to generate a first amplified signal;

amplifying the image signal with a second gain characteristic, differing from the first gain characteristic, to generate a second amplified signal; and selecting the first amplified signal and the second amplified signal alternately.

11. A method of processing an image signal for display as an image by an image display unit, comprising the steps of:

periodically varying a waveform characteristic of the image signal by acting directly on said image signal, further comprising the step of determining a resolution of the image signal, said step of periodically varying being performed depending on the resolution, wherein the step of periodically varying said waveform characteristic is performed when said resolution is higher than a predetermined value and is not performed when said resolution is lower than the predetermined value.

* * * * *

UNITED STATES PATENT AND TRADEMARK OFFICE

CERTIFICATE OF CORRECTION

PATENT NO. : 7,471,344 B1
APPLICATION NO. : 09/499369
DATED : December 30, 2008
INVENTOR(S) : Toshitsugu Wakabayashi It is certified that error appears in the above-identified patent and that said Letters Patent is hereby corrected as shown below:

Title Page Item (73) Assignee:

The line reading "Mitsubishi Denki K.K., Tokyo (JP)" should read --NEC Display Solutions, Ltd., Tokyo (JP)--.

Signed and Sealed this

Twenty-eighth Day of September, 2010

David J. Kappos
*Director of the United States Patent and Trademark Office*